US012129808B2

(12) United States Patent
Perrot et al.

(10) Patent No.: US 12,129,808 B2
(45) Date of Patent: Oct. 29, 2024

(54) METHOD OF DETERMINING THE OPENING DELAY OF A FUEL INJECTOR

(71) Applicant: DELPHI TECHNOLOGIES IP LIMITED, St. Michael (BB)

(72) Inventors: Baptiste Perrot, Blois (FR); David Gacon, Blois (FR)

(73) Assignee: PHINIA JERSEY HOLDINGS LLC, Wilmington, DE (US)

(*) Notice: Subject to any disclaimer, the term of this patent is extended or adjusted under 35 U.S.C. 154(b) by 0 days.

(21) Appl. No.: 18/277,287

(22) PCT Filed: Feb. 11, 2022

(86) PCT No.: PCT/EP2022/053412
§ 371 (c)(1),
(2) Date: Aug. 15, 2023

(87) PCT Pub. No.: WO2022/171818
PCT Pub. Date: Aug. 18, 2022

(65) Prior Publication Data
US 2024/0141849 A1 May 2, 2024

(30) Foreign Application Priority Data
Feb. 15, 2021 (GB) ...................................... 2102084

(51) Int. Cl.
*F02D 41/24* (2006.01)
*F02D 41/20* (2006.01)

(52) U.S. Cl.
CPC ........... *F02D 41/247* (2013.01); *F02D 41/20* (2013.01); *F02D 2041/2055* (2013.01)

(58) Field of Classification Search
CPC .. F02D 41/20; F02D 41/2467; F02D 41/2096; F02D 41/30; F02D 41/40;
(Continued)

(56) References Cited

U.S. PATENT DOCUMENTS 4,856,482 A * 8/1989 Linder ................. H01H 47/325 123/506
5,245,501 A * 9/1993 Locher .................. H01F 7/1844 361/194
(Continued)

FOREIGN PATENT DOCUMENTS

DE 102014222556 A1 5/2016
WO 2016091848 A1 6/2016

OTHER PUBLICATIONS

Information Search Report for PCT/EP2022/053412 dated Jun. 10, 2022, 4 pages.
(Continued)

*Primary Examiner* — Hai H Huynh
*Assistant Examiner* — Johnny H Hoang
(74) *Attorney, Agent, or Firm* — Warner Norcross + Judd LLP

(57) ABSTRACT

A method of controlling the operation of a solenoid activated fuel injector, the fuel injector including an actuator including a solenoid, and being adapted to control a needle valve dependent on an activation pulse sent to the solenoid to control the needle valve to dispense fuel.

The method comprises the steps of:

a) determining the minimum drive pulse ($MDP_1$) required for the needle valve to open;
b) determining the closing response of the injector during MDP conditions;
c) determining the total operational time during MDP conditions of the injector;
d)—determining the difference between the value determined from step c) and a stored value;
e) determining the value of the difference between the opening delay of the injector and a stored the opening delay of the reference injector from step d); and
f) controlling the operation based on the parameter at e).

8 Claims, 3 Drawing Sheets

(58) Field of Classification Search
CPC ........... F02D 41/402; F02D 2041/1429; F02D 2041/2031; F02D 2041/2051; F02D 2041/2055; F02D 2041/2058; F02D 2200/0618; Y02T 10/40
See application file for complete search history.

(56) References Cited

U.S. PATENT DOCUMENTS

| | | | | |
|---|---|---|---|---|
| 9,206,758 | B2 | 12/2015 | Rodriguez-Amaya et al. | |
| 2012/0191327 | A1* | 7/2012 | Joos | F02D 41/20 701/105 |
| 2016/0138511 | A1 | 5/2016 | Toyohara et al. | |
| 2018/0128200 | A1* | 5/2018 | Hu | F02D 41/40 |

OTHER PUBLICATIONS

Machine assisted English translation of DE102014222556A1 obtained from https://worldwide.espacenet.com/patent on Aug. 4, 2023, 12 pages.

* cited by examiner

METHOD OF DETERMINING THE OPENING DELAY OF A FUEL INJECTOR

CROSS-REFERENCE TO RELATED APPLICATIONS

This application is the U.S. National Stage of International Application No. PCT/EP2022/053412 filed on 11 Feb. 2022, which claims priority to and all advantages of United Kingdom Application No. 2102084.7 filed on 15 Feb. 2021, the contents of which are incorporated herein by reference.

TECHNICAL FIELD

This relates to a method of determining operational characteristics of fuel injectors, in particular the opening response/delay of a fuel injector. Such parameters can be subsequent used in control of injectors. It has particular, but not exclusive application to direct acting fuel injectors.

BACKGROUND OF THE INVENTION

Modern fuel injectors typically use electrical actuators (such as piezo or solenoid operated actuators) which are used to operate a needle valve, the valve opening and closing in order to dispense fuel to a combustion chamber via movement of a needle of a needle valve away from a seat. Typically an activation pulse(s) of certain duration (pulse width) is sent to the electrical actuator (e.g. solenoid actuator) operate the fuel injector. The quantity of fuel injected into a combustion space is dependent on the duration of the pulse(s). Fuel injectors may be of the type where the actuator directly moves a pintle/needle away from the valve seat to dispense fuel; e.g. against the biasing spring means; this is referred to as a direct injector, and such injectors are used for both gasoline and diesel. The invention has particular application to such direct injectors.

In an alternative design many modern fuel injectors are hydraulically operated in that rather than the (e.g. solenoid) actuator actuating the needle directly, the actuator to operate a hydraulic valve (system) so as to control pressure in the fuel injector so as to indirectly move the needle from the valve seat so as to selectively dispense fuel.

So, to recap, solenoid-controlled fuel injectors are operated by sending a drive pulse (activation profile) to the solenoid actuator of the fuel injector. Activation of the solenoid causes the needle of a needle valve to lift from a valve seat to dispense fuel.

The needle of such a needle valve arrangement may be activated directly by the solenoid by movement of the pintle/needle arrangement. The amount of fuel dispensed in a solenoid-controlled fuel injector is done varying the activation of the solenoid via an activation profile comprising one or more pulse sent to the solenoid of the solenoid actuator and generally the fuel is controlled by the duration of the pulse(s).

The characteristics of fuel injectors change over time. Therefore, it is necessary to perform closed loop control and compensation strategies. So injectors are typically compensated over time by performing various learning strategies, where the behaviors and characteristics (e.g. parameters) of the fuel injector are learnt over time, in order to compute correction values with respect to e.g. activation pulse duration and applying these compensation values or “trims” during live injector operation. This strategy is often called ICLC (Injector Close Loop Compensation)

Much current methodology doesn’t consider (e.g. variation of) physical opening delay (OD) of an e.g. gasoline injector, leading to a poor ICLC performance in case of a non-nominal (i.e. OD injector which varies with age). In extreme cases, corrected injectors could be worse than initial behavior.

It is known to overcome the problems by performing an injector current measurement methodology embodied in ECU in order to capture the change of slope of the current during the free-wheeling stage (voltage drive at 0V just after Boost voltage). This methodology has several constraints: e.g. an electronic hardware constraint which means there are specific current measurements inside ECU requires extra functionality circuitry to do this function, resulting in extra complexity and cost. The is also an electronic driver constraint: there needs to be a quite long free-wheeling phase to be able to catch the opening delay OD (considering margin after peak and before hold), and a lot of injector suppliers don’t allow this. There is also an injector drivability constraint; the opening delay of the injector must appear during this specific detection window. In addition, there is an injector constraint over time: the opening delay can drift over time but drifted opening delay should always be within detection window. That means a too large drift of opening delay cannot be detected.

It is one object of the invention to provide a method of closed loop control of fuel injectors which considers variations in e.g. open delay which overcome these disadvantages.

SUMMARY OF THE INVENTION

In one aspect is provided a method of controlling the operation of a solenoid activated fuel injector, said fuel injector including an actuator including a solenoid, and adapted to control a needle valve dependent on an activation pulse sent to said solenoid, so as to control said needle valve via movement of a needle from and to a valve seat to dispense fuel, said method comprising the steps of:

a) determining the minimum drive pulse ($MDP_1$) required for the needle valve of said injector to open;

b) determining the closing response ($CR_{MDP1}$) of the injector during MDP conditions, where the closing response is defined as the time duration between the end of activation pulse (t3) and the time that needle valve closes (t4);

c) from steps a) and b) determine the total operational time ($TOD_{MDP1}$) during MDP conditions of the injector, where the total operation time is defined as the time between the start of the activation pulse and the time of the needle valve closing;

d) determining the difference ($\Delta TOD_{MDP}$) between the value ($TOD_{MDP1}$) determined from step c) and a stored value of total operational time during MDP conditions for a reference injector ($TOD_{refMDP}$)

e) determining the value of the difference between the opening delay of the injector ($\Delta OD$) and a stored the opening delay of the reference injector from step d)

f) controlling the operation based on the parameter at e).

In Step e) the difference value e) may be computed from the equation: $\Delta OD = \Delta TOD_{MDP}$ The method may includeg determining open delay $OD_1$ of said injector from the value computed at step e) and stored reference value of opening delay for said reference injector $OD_{ref}$, and in step f) using said value of $OD_1$ to subsequently control the operation of the injector.

The parameter $TOD_{MDP1}$ may be computed from the following equation:

$$TOD_{MDP1}=MDP_1+CR_{MDP1}$$

The method may including the step of analyzing the voltage signal across said solenoid actuator to determine the point of valve closing t4.

Said point of valve closing time may be determined by identifying a glitch.

The method may include a performing a sweep comprising a series of actuations of said fuel injector at different drive (actuation pulse) durations, and from such sweep determining the values in steps a) and/or b).

The minimum drive pulse conditions may be determined from analysing values of closing response obtained in said sweep.

The term activation pulse, although written in the singular, may be considered activation profile and may comprises a series of pulses. So the term "end of the activation pulse" should be interpreted to mean the end of the final activation or hold pulses in an activation profile.

BRIEF DESCRIPTION OF THE DRAWINGS

The present invention is now described by way of example with reference to the accompanying drawings in which.

DESCRIPTION OF THE PREFERRED EMBODIMENTS

Figure 1:
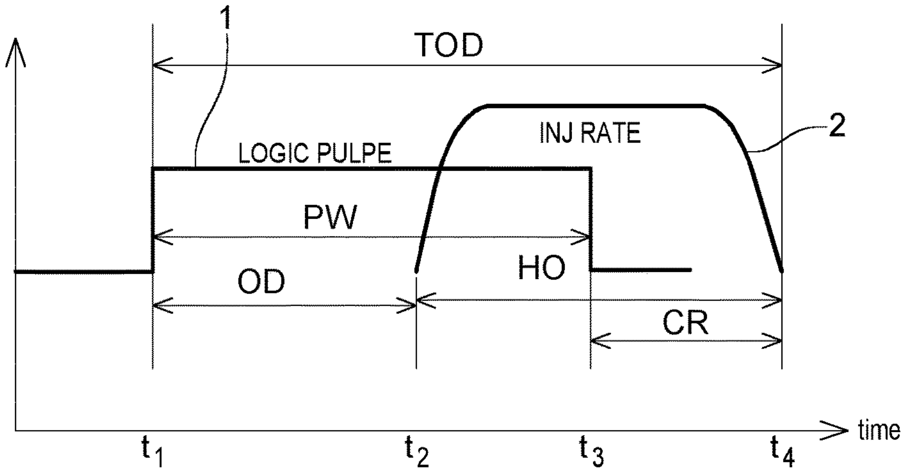
FIG. 1 shows simplified plots against time of an activation (logic) pulse 1 sent to the solenoid of a solenoid activated fuel injector and plot 2 shows the fuel injection rate i.e. from the needle valve.

FIG. 1 shows simplified plots against time of an activation (logic) pulse 1 sent to the solenoid (or driver thereof) of a solenoid activated fuel injector and plot 2 shows the fuel injection rate i.e. from the needle valve. The pulse width (PW) is of the activation pulse is shown; starting from timepoint t1 and ending at t3. The needle valve opening and closing general is delayed; from the activation pulse start/end respectively. The needle valve opens at point t2 and closes at t4; hence fuel is injected between these times; HO refers to the time therebetween which is referred to as the hydraulic opening or needle valve opening time. The closing response (CR) (often referred to alternatively as closing delay (CD) is the time between points t3 and t4. t4 is the closing time (CT). The opening delay (OD) is that between t1 and t2, from the start of the activation pulse to the start of the needle valve opening. This parameter is important for the control. The total operational duration (TOD) is defined as the time between the start of the activation pulset1 and the time that the valve closes t4 or (closing time CT).

Figure 2:
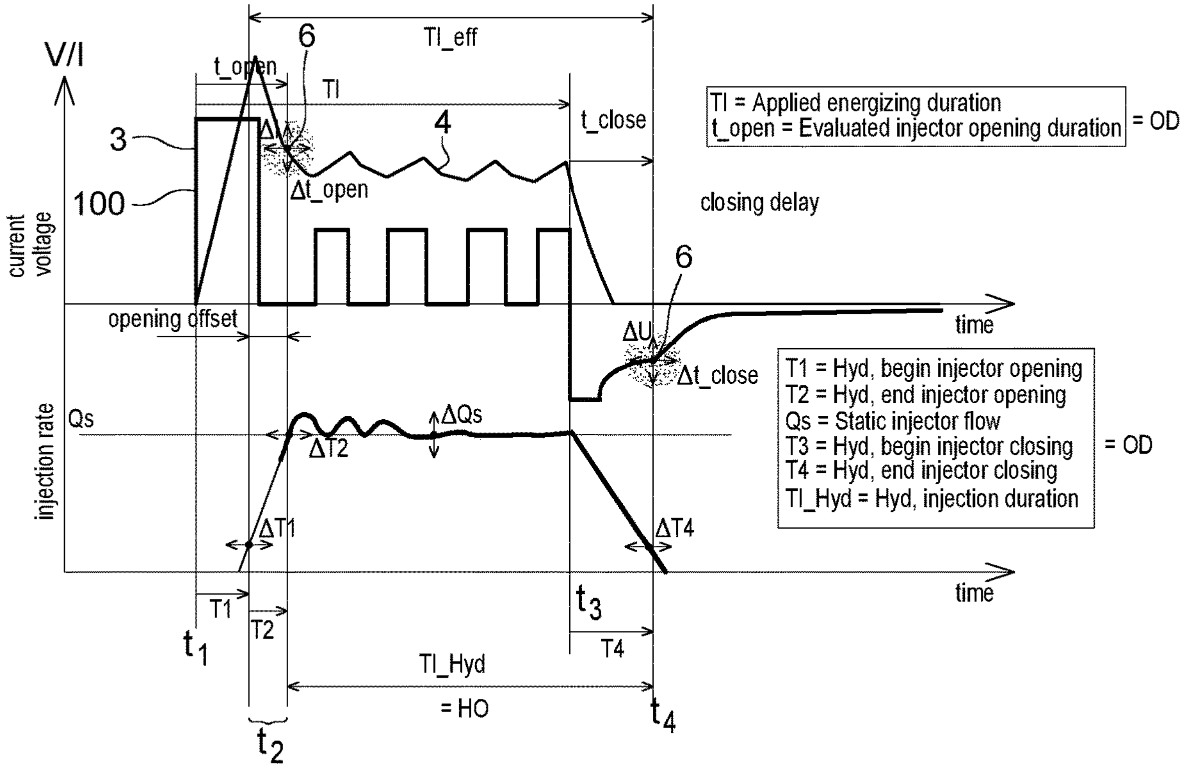
FIG. 2 shows prior art methodology of closed loop control.

FIG. 2 shows prior art methodology of closed loop control. Reference numeral 3 shows the voltage across the solenoid, defined or rather set according to the activation profile or pulse(s) sent to the (solenoid) actuator, and as can be seen this is shown initially as an initial large magnitude activation pulse 100 to move the needle/pintle, followed by a series of small "hold" pulses 101 to keep the pintle in the open position. Reference numeral 4 shows the corresponding current through the solenoid of the actuator.

The lower plot shows the consequent injection rate 5 corresponding to a voltage plot 3. The various timings are shown in the legend. "t2" of FIG. 1 may be considered any time points within the arrows T1 or T2 i.e. start of injector (needle valve) opening or end of (needle valve) injector opening, or any time therebetween. "t4" of FIG. 1 may be considered at the end of arrow T4.

"t_open" is the same as the opening delay, OD There may be variation of the opening time point 6 (which is the same as t2 in FIG. 1) shown by Δt_open. TI_hydr is the same as HO of FIG. 1. As can be seen there is a glitch G in the voltage signal, after t3, which is observable when the needle valve closes due to the needle hitting the valve seat.

The time T1+T2, called also t_open, is the time to reach injector full lift; i.e. for the injector to fully open. In some examples the term "opening Delay" (OD) may be defined as the time form start of activation to the time of this full opening (or the time to start of opening) and reference to the term OD/Opening delay should be interpreted as covering both options. In examples therefore the strategy consider that the variation of T2 (here the point ΔT2) is equal to the variation of T1 (here, the point ΔT1). Opening offset is a calibration, then T1 is known.

Figure 3:
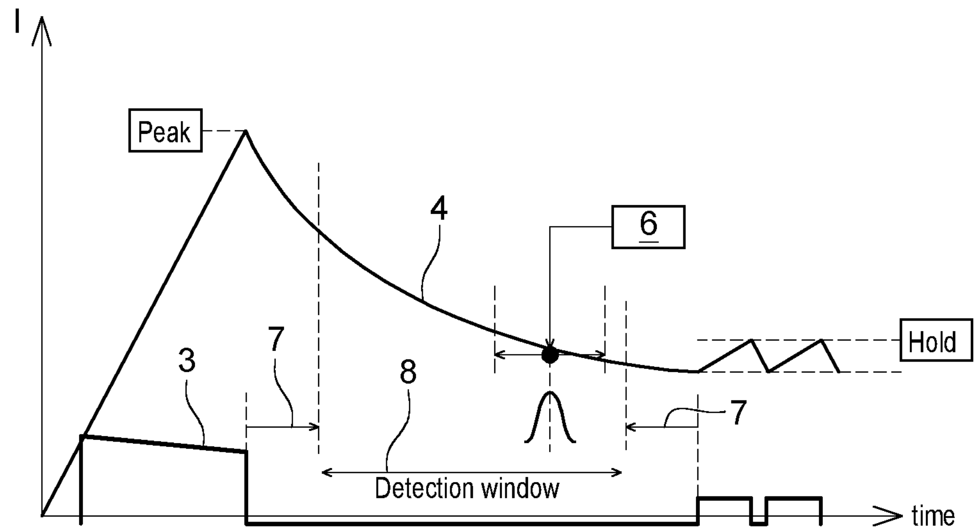
FIG. 3 shows the prior art method of determining the open delay and shows the first half of current plot 4 in and the voltage plot magnified in more detail.

FIG. 3 shows the prior art method of determining the open delay and shows the first half of current plot 4 in and the voltage plot magnified in more detail. The start of valve opening (t2) in FIGS. 2 and 3 is shown by reference numeral 6. In prior art methods between time offsets 7 from the end of the first/initial high magnitude pulse and the start of the first smaller magnitude hold pulse is a time window 8 where there is a barely detectable glitch at 6 to determine opening time.

The problem of poor ICLC performance in case of Opening Delay deviation may be solved according to aspects of the invention by estimating the opening delay deviation according to methodology described below. The inventors have determined that it is not required to determine the absolute OD to (provide e.g strategies and closed loop response to reduce the impact of varying OD on fueling) and in aspects, an Opening Delay Deviation (Delta OD) around a nominal or reference value (which is can be regarded as a called MASTER OD) is determined and used.

The following equation (see FIG. 1) relates to the respective parameters:

$$OD+HO=PW+CR \quad \text{equation 1 (see FIG. 1)}$$

where OD is opening delay, HO is hydraulic opening, PW is pulse width and CR is closing response. Moreover, $$PW+CR=TOD \quad \text{equation 2}$$

where TOD is defined as the time between start of pulse and the time the needle closes.

The inventors have determined that the difference between the respective parameters at conditions of minimum drive pulse of a nominal (standard, reference) and an actual injector (under test/to be controlled) are related as in the following equation, (Δ represents the difference)

$$\Delta OD+\Delta HO=\Delta MDP+\Delta CR=\Delta TOD \quad \text{equation 3}$$

Where MDP is the minimum drive pulse, that is the minimum duration of a actuator drive pulse that is required for the valve to open and dispense a (a very small quantity) of fuel. This parameter is well known to the skilled person.

At operation conditions close to the MDP, the value of fueling is very small and values of Hydraulic Opening for a nominal/reference and actual (test) injector are similar; and so ΔHO is close to zero. In such a case then, $$\Delta OD=\Delta TOD. \quad \text{Equation 4}$$

The inventors have made use of this simplified equation at MDP conditions to allow a simplified method to determine variation in the opening delay from a nominal/reference injector Generally, at the MDP, the parameters or characteristics of OD and TOD of two injectors are compared: a nominal/reference injector and the actual injector under test or observation (to be subsequently controlled) such as an aged injector sued in a vehicle injector. The variation of opening delay can be computed Values of parameters/characteristics of the nominal or reference injector ($TOD_{refMDP}$)) and $OD_{ref\ MDP}$ may be stored in the ECU e.g. in a MAP.

Methodology

In a first step, (during ICLC learning), a specific pulse width loop (series of injections with varying pulse duration) is performed at very low fueling levels (for example 0 mg up to 2 mg for example). In other word for the fuel injector under test, a sweep is performed where the injector is sequential operated with different actuation pulse widths (e.g. increasing pulse width). The value of closing response CR is recorded for each of these. The closing response can be found by the time difference between the end of the activation pulse t3 (known to the ECU) and the needle valve closing time t4 which can be found by detecting a glitch in the voltage signal across the solenoid actuator terminals. The term "glitch" is well understood in the field by the skilled person and can be found form the first/second derivatives of the voltage plot/signal.

Figure 4:
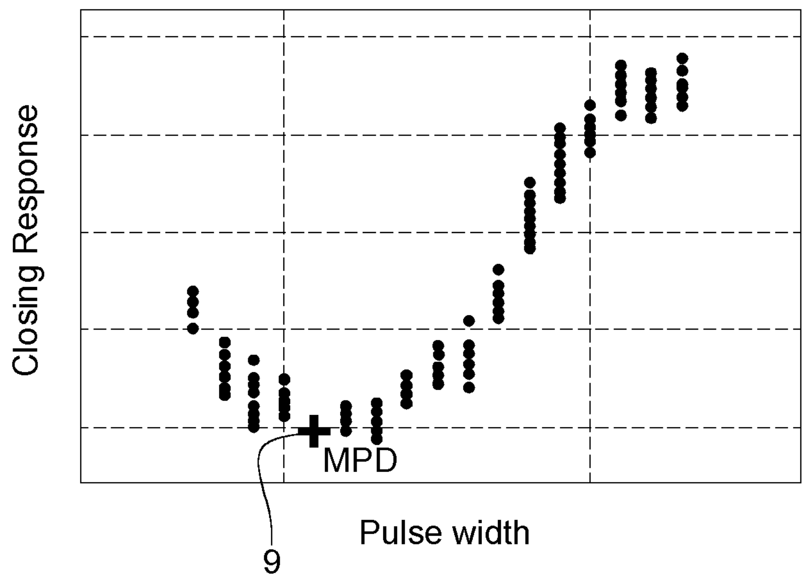
FIG. 4 shows a plot of closing response CR against solenoid actuator) activation pulse width.

FIG. 4 shows a plot of closing response CR against solenoid actuator) activation pulse width and the minimum drive pulse (MDP) (that is the minimum drive pulse required for the valve to open i.e. when some fuel is injected) is shown by point 9.

So, to recap, the Minimum Drive Pulse (MDP) is the minimum energizing time to have an injection quantity. This value (MDP) determined during this loop process of a series of injection and point 9 is determined by looking for the minimum of a V-Shape in the Pulse width Vs CR curve. Other methods of determining the MDP are known in the art. As mentioned, closing response CR is found from the end of activation pulse to or the closing time of the needle valve (the latter which may be determined by looking for a glitch in the voltage signal across the solenoid actuator). Such techniques and others of determining minimum drive pulse are well known in the art). A glitch is well known to those in the art and may be considered a point of inflection or local max/min in a signal So, because of the above, the value $CR_{MDP}$ is the corresponding closing response value for the MDP of the actual fuel injector under test is determined.

Next the corresponding nominal Total Operational Duration TOD (at MDP) for the actual fuel injector (under test to be controlled) is determined $$TOD_{MDP}=MDP+CR_{MDP} \quad \text{equation 5 from equation 2}$$

$TOD_{MDP1}=MDP_1+CR_{MDP1}$ where "1" refers to the actuator injector under test/to be controlled MDP is known from the ECU logic, The value of $TOD_{MDP}$ for the fuel injector under test $TOD_{MDP1}$ is then compared with the value(s) of TOD at MDP ($TODref_{MDP}$) for the nominal fuel injector (the latter is stored in the ECU) and the difference determined $$TOD_{refMDP}-TOD_{MDP1}=\Delta TOD_{MDP} \quad \text{equation 6}$$

Thus, from equation 4 the difference ΔOD between the opening delay of the reference injector and injector under test can be found from equation 4 reference injector;

$$\Delta OD=\Delta TOD_{MDP}$$

Illustration

Figure 5:
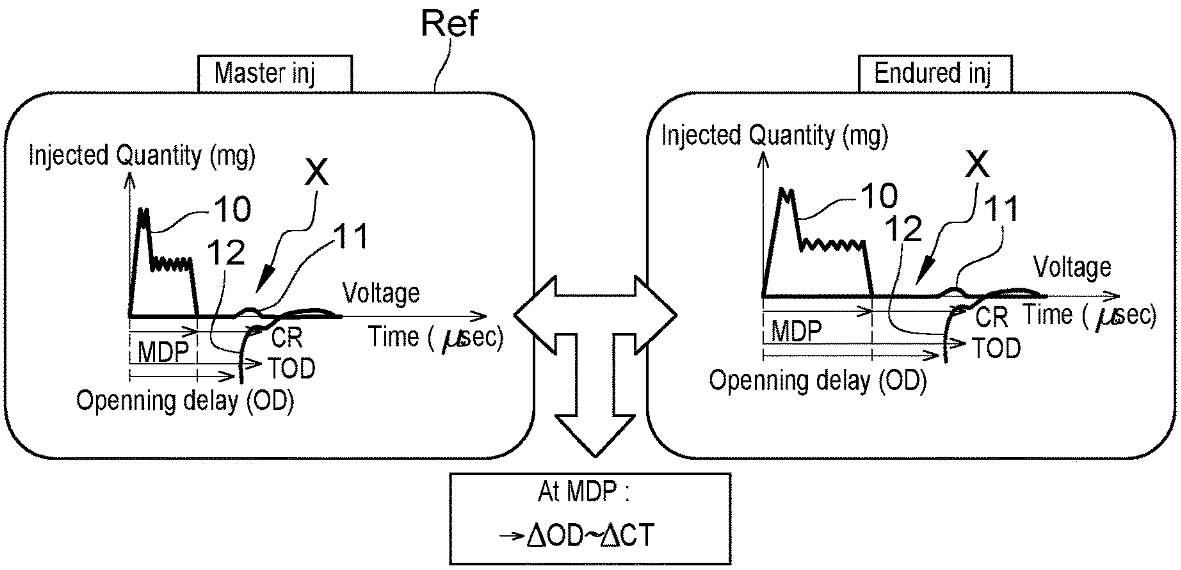
FIG. 5 illustrates the methodology

FIG. 5 illustrates the methodology. On the left had side is shown the plots of the voltage 10 (i.e. which exists across the solenoid and can measured) as well as the fuel injected X when applying a minimum drive pule to a master or nominal/reference injector. On the right hand side is shown the plots of the voltage measured (i.e. which exists across the solenoid) as well as the fuel injected when applying a minimum drive pulse to an actual fuel injector under test/observation to be controlled (aged/endured injector).

In both case there is a very small fuel injected quantity shown by the small peak (designated with reference numeral as 11) in the plots (identified by a glitch in the voltage signal)). The arrows at the bottom show the respective parameters of Opening Delay (OD) Minimum Drive pulse (MDP), Total Operational Duration (TOD), and closing response (CR). The end of the arrows of TOD and CR are thus coincident with the glitch signal resulting from valve closing/

At or close to activation pulses near to the MDP, ΔOD=ΔTOD. The characteristic of TOD of a nominal injector (at MDP) is considered known (and as mentioned can be can be stored in ECU). The TOD of tested injector is determined because we know the pulse width PW value (MDP value at this point) and CR at this PW (MDP) value (specific loop, as explained at the beginning), Finally, estimate Opening Delay variation is done by deviation from a nominal value or reference value (i.e. of a reference injector which may be stored in the ECU). As a result, ICLC performance is highly improved in case of no-nominal OD injector.

The invention claimed is:

1. A method of controlling operation of a solenoid activated fuel injector, the solenoid activated fuel injector including an actuator including a solenoid, and being adapted to control a needle valve dependent on an activation pulse sent to the solenoid, the needle valve including a needle and a valve seat, so as to control the needle valve via movement of the needle from and to the valve seat to dispense fuel, said method comprising the steps of:

a) determining a minimum drive pulse ($MDP_1$) required for the needle valve of the injector to open;

b) determining a closing response ($CR_{MDP1}$) of the injector during MDP conditions, where the closing response is defined as a time duration between an end of activation pulse (t3) and a time that needle valve closes (t4);

c) from steps a) and b), determining a total operational time ($TOD_{MDP1}$) during MDP conditions of the injector, where the total operational time is defined as a time between a start of the activation pulse and the time of the needle valve closing;

d) determining a difference ($\Delta TOD_{MDP}$) between the total operational time ($TOD_{MDP1}$) determined from step c) and a stored value of total operational time during MDP conditions for a reference fuel injector ($TOD_{refMDP}$);

e) determining a value of a difference (AOD) between an opening delay of the injector ($OD_1$) and a stored value of an opening delay of the reference fuel injector ($OD_{ref}$) of step d); and f) controlling the operation of the solenoid activated fuel injector based on the difference value determined at step e).

2. A method as claimed in claim 1 wherein in step e) the difference value is computed from equation: $\Delta OD=\Delta TOD_{MDP}$.

3. A method as claimed in claim 2 including the step of determining open delay ($OD_1$) of the injector from the difference value computed at step e) and the stored value of opening delay for the reference injector ($OD_{ref}$); and in step f), using the value of $OD_1$ to subsequently control the operation of the injector.

4. A method as claimed in claim 1 where in step c), the parameter $TOD_{MDP1}$ is computed form the following equation:

$$TOD_{MDP1}=MDP_1+CR_{MDP1}.$$

5. A method as claimed in claim 1 including the step of analyzing a voltage signal across the solenoid of the actuator to determine the time that needle valve closes t4.

6. A method as claimed in claim 5 where the time that needle valve closes is determined by identifying a glitch.

7. A method as claimed in claim 1 including the step of performing a sweep comprising a series of actuations of the fuel injector at different drive (actuation pulse) durations, and from such sweep determining the values in one or both of steps a) and b).

8. A method as claimed in claim 7 where the minimum drive pulse conditions are determined from analyzing values of closing response obtained in the sweep.

* * * * *